(12) United States Patent
Park et al.

(10) Patent No.: US 10,603,867 B1
(45) Date of Patent: Mar. 31, 2020

(54) CARBON FIBERS AND METHODS OF PRODUCING THE SAME

(75) Inventors: Benjamin Park, Mission Viejo, CA (US); Genis Turon Teixidor, Fullerton, CA (US); William Schank, Howell, MI (US); Lothar Steffens, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 1353 days.

(21) Appl. No.: 13/477,996

(22) Filed: May 22, 2012

Related U.S. Application Data

(60) Provisional application No. 61/489,585, filed on May 24, 2011.

(51) Int. Cl.
*B32B 5/02* (2006.01)

(52) U.S. Cl.
CPC ..................................... *B32B 5/02* (2013.01)

(58) Field of Classification Search
CPC ............ C01B 31/00; C01B 31/02; B32B 5/02
USPC .......................................... 423/445; 428/220
See application file for complete search history.

(56) References Cited

U.S. PATENT DOCUMENTS

| | | | |
|---|---|---|---|
| 3,238,054 A * | 3/1966 | Bickerdike | C04B 35/83 201/21 |
| 4,059,468 A | 11/1977 | Bouillon | |
| 4,292,144 A | 9/1981 | Lepetit et al. | |
| 4,938,942 A | 7/1990 | Gorman et al. | |
| 5,356,707 A | 10/1994 | McCullough, Jr. et al. | |
| 5,605,755 A | 2/1997 | Patil et al. | |
| 6,013,207 A * | 1/2000 | Takahashi | C04B 30/02 264/29.2 |
| 6,143,268 A | 11/2000 | Dahn et al. | |
| 6,197,450 B1 | 3/2001 | Nathan et al. | |
| 6,245,385 B1 | 6/2001 | Takahashi et al. | |
| 6,316,144 B1 | 11/2001 | Xue et al. | |
| 6,337,159 B1 | 1/2002 | Peled et al. | |
| 6,410,128 B1 | 6/2002 | Calarco et al. | |
| 6,592,982 B2 | 7/2003 | Calarco et al. | |
| 6,699,427 B2 * | 3/2004 | Huang | C04B 35/521 264/125 |
| 7,014,681 B2 | 3/2006 | Noack et al. | |
| RE41,578 E | 8/2010 | Nathan et al. | |
| 8,603,683 B2 | 12/2013 | Park et al. | |
| 9,178,208 B2 | 11/2015 | Park et al. | |
| 9,397,338 B2 | 7/2016 | Park et al. | |
| 9,553,303 B2 | 1/2017 | Park et al. | |
| 9,583,757 B2 | 2/2017 | Park et al. | |

(Continued)

FOREIGN PATENT DOCUMENTS

| | | | | |
|---|---|---|---|---|
| EP | 1524253 A1 * | 4/2005 | | C04B 35/573 |
| JP | 2005285382 A * | 10/2005 | | |

OTHER PUBLICATIONS

Machine_English_Translation_JP_2005285382_A; Takeda, Yasuo; Oct. 13, 2005; JPO; whole document.*

(Continued)

*Primary Examiner* — Tahseen Khan
(74) *Attorney, Agent, or Firm* — Knobbe, Martens, Olson & Bear, LLP

(57) ABSTRACT

Methods of forming carbon from cotton cloth and the product thereof are provided. The carbon described herein can be used as a structural component and/or as a conductive additive in various battery applications. The method of manufacturing a carbon comprises providing a cotton cloth and pyrolyzing the cotton cloth to form a carbon.

12 Claims, 1 Drawing Sheet

(56) References Cited

U.S. PATENT DOCUMENTS

| | | | |
|---|---|---|---|
| 9,620,809 B2 | 4/2017 | Turon Teixidor et al. | |
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 10,388,943 B2 | 8/2019 | Bonhomme et al. | |
| 10,431,808 B2 | 10/2019 | Park et al. | |
| 2002/0058179 A1 | 5/2002 | Segit et al. | |
| 2004/0005446 A1 | 1/2004 | Chiu et al. | |
| 2004/0105969 A1* | 6/2004 | Huang | C04B 35/521 |
| | | | 428/292.1 |
| 2005/0260909 A1* | 11/2005 | Hirahara | D03D 15/00 |
| | | | 442/179 |
| 2006/0130895 A1* | 6/2006 | Gaudiana et al. | 136/263 |
| 2007/0021300 A1* | 1/2007 | Farant | B01J 20/20 |
| | | | 502/430 |
| 2009/0239123 A1* | 9/2009 | Kotera | H01M 8/1018 |
| | | | 429/530 |
| 2010/0150814 A1 | 6/2010 | Gadkaree et al. | |
| 2010/0230191 A1* | 9/2010 | Birke | H01M 4/131 |
| | | | 180/65.21 |
| 2010/0255376 A1 | 10/2010 | Park et al. | |
| 2011/0020701 A1 | 1/2011 | Park et al. | |
| 2014/0170498 A1 | 6/2014 | Park | |
| 2014/0295290 A1 | 10/2014 | Park et al. | |
| 2017/0040598 A1 | 2/2017 | Wang et al. | |
| 2017/0133664 A1 | 5/2017 | Park et al. | |
| 2017/0133665 A1 | 5/2017 | Park et al. | |
| 2017/0133670 A1 | 5/2017 | Park et al. | |
| 2017/0155126 A1 | 6/2017 | Park et al. | |
| 2017/0170510 A1 | 6/2017 | Turon Teixidor et al. | |
| 2017/0279093 A1 | 9/2017 | Park | |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |
| 2019/0178944 A1 | 6/2019 | Rango et al. | |
| 2019/0181426 A1 | 6/2019 | Park et al. | |
| 2019/0181431 A1 | 6/2019 | Canton | |
| 2019/0181434 A1 | 6/2019 | Lee et al. | |
| 2019/0181440 A1 | 6/2019 | Park et al. | |
| 2019/0181441 A1 | 6/2019 | Ji et al. | |
| 2019/0181491 A1 | 6/2019 | Park et al. | |
| 2019/0181492 A1 | 6/2019 | Liu et al. | |
| 2019/0181500 A1 | 6/2019 | Ji et al. | |
| 2019/0181501 A1 | 6/2019 | Ji et al. | |
| 2019/0181502 A1 | 6/2019 | Ji et al. | |
| 2019/0190069 A1 | 6/2019 | Ji et al. | |
| 2019/0190070 A1 | 6/2019 | Ji et al. | |

OTHER PUBLICATIONS

Machine_English_translation_EP_1524253_A1 ; Naegele, Helmut; Process of Manufacture of Conductive Shaped Parts; Apr. 20, 2005; EPO; whole document.*

* cited by examiner

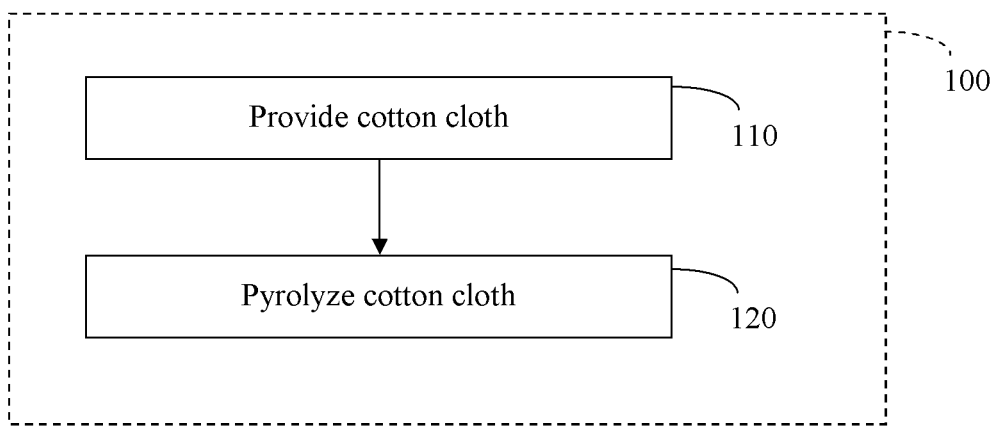

CARBON FIBERS AND METHODS OF PRODUCING THE SAME

CROSS-REFERENCE TO RELATED APPLICATIONS

This application claims the benefit of U.S. Provisional Application Nos. 61/489,585, filed May 24, 2011, the entirety of which is hereby incorporated by reference.

BACKGROUND

Field

The present application relates generally to carbon materials and methods of making of carbon materials. In particular, certain embodiments relate to forming carbon materials from cotton cloth.

Description of the Related Art

Certain classes of carbon fiber and carbon cloth are made using a process which generally starts with a pitch based fiber precursor which is pyrolyzed to the carbon state. The carbon fibers are then formed into a carbon cloth.

SUMMARY

Some embodiments provide a method of manufacturing carbon comprising providing a cotton cloth and pyrolyzing the cotton cloth to form a carbon. In some embodiments, the carbon may comprise carbon cloth. In some embodiments, the cotton cloth is hot pressed prior to pyrolysis.

Some embodiments provide a carbon cloth formed by the method comprising providing a cotton cloth and pyrolyzing the cotton cloth to form a carbon.

Some embodiments provide a carbon cloth comprising carbon formed from pyrolyzing a cotton cloth.

Some embodiments provide a battery comprising the carbon cloth formed by the method comprising providing a cotton cloth and pyrolyzing the cotton cloth to form a carbon. Some embodiments provide a battery comprising the carbon cloth comprising carbon formed from pyrolyzing a cotton cloth.

BRIEF DESCRIPTION OF THE DRAWINGS

FIG. 1 is a flow diagram of an example method compatible with certain embodiments described herein.

DETAILED DESCRIPTION

Described herein are carbons (e.g., carbon cloth) and methods to produce carbon that use cotton (e.g., cotton cloth, cotton fabric, cotton weave, etc.) as the precursor. The cotton is pyrolyzed or carbonized to form a carbon (e.g., hard carbon). For example, cotton cloth can be used as a precursor in the making of carbon cloth (e.g., fabric, weave, etc.). FIG. 1 is a flow diagram of an example method 100 compatible with certain embodiments described herein. In operational block 110, a cotton cloth is provided, and in operational block 120, the cotton cloth is pyrolyzed. In certain embodiments, cotton fibers are woven into a cotton cloth, chemically pretreated/stabilized, and then pyrolyzed to form a carbon cloth. Advantages to using cotton as a precursor include, but are not limited to, lower cost and the ability to produce carbon cloth that can be much thinner and lighter per a given area than other carbon cloths that are produced by certain other methods.

In certain embodiments, a very fine cotton cloth is used. For example, the cotton cloth can have a density of about 1 to about 10 mg/cm$^2$. In one embodiment, the cotton cloth has a density of about 4.2 mg/cm$^2$. The cotton cloth can have a thread count of about 1 to about 100 threads/cm, or about 1 to about 50 threads/cm. In one embodiment, the thread count is about 28 threads/cm. Cotton cloth can be, for example, a weave, knit, intertwine, interlace, etc.

The cotton cloth can be pyrolyzed to form carbon cloth. The cotton cloth can be pyrolyzed by heating the cotton cloth. In one embodiment, the pyrolysis temperature is greater than about 900° C. Pyrolysis can be done in a controlled atmosphere. For example, an inert atmosphere, a vacuum and/or flowing argon, nitrogen, or helium gas can be used. In some embodiments, the cotton cloth is heated to about 800° C. to about 2800° C., about 900° C. to about 1350° C., or about 900° C. to about 1100° C. The dwell time at the pyrolysis temperature can be from about 10 minutes to about 2 hours, or about 30 minutes to about 1 hour. In certain embodiments, the heat up rate and/or cool down rate of the cotton cloth is about 10° C./min. In some embodiments, the cotton cloth is substantially or fully pyrolyzed or carbonized to substantially or completely form carbon. Further description of methods of pyrolysis and carbonization is described in U.S. patent application Ser. No. 13/008,800, filed Jan. 18, 2011, entitled "Composite Materials for Electrochemical Storage," the entirety of which is hereby incorporated by reference.

In certain embodiments, the cotton cloth is hot pressed prior to pyrolyzing the cotton cloth. In some embodiments, the hot pressing temperature can be from about 200° C. to about 400° C., or about 250° C. to about 350° C. In one embodiment, the temperature that the cotton cloth is hot pressed at is about 300° C. Hot pressing prior to pyrolyzing can stabilize the size and can reduce or prevent shrinking. In some embodiment, the cotton cloth is not hot pressed prior to pyrolysis.

These processes could be batch or continuous in nature. For example, hot pressing the cotton cloth and/or pyrolyzing the cotton cloth can be performed in a continuous process. The cotton cloth can be rolled and unrolled, and fed into machines for processing.

The carbon cloth formed by pyrolysis of the cotton cloth can result in fine texture. In certain embodiments, the carbon cloth has a density of about 0.5 to about 10 mg/cm$^2$. In one embodiment, the carbon cloth has a density of about 2.65 mg/cm$^2$. The carbon cloth may have a thread count similar to the cotton cloth. Furthermore, in certain embodiments, the carbon cloth has a thickness of about 10 to about 100 microns. For example, the carbon cloth can have a thickness of about 60 microns. Carbon cloth can be, for example, a weave, knit, intertwine, interlace, etc. In some embodiments, the carbon cloth retains the same structure as the cotton cloth prior to pyrolysis.

The resulting carbon cloth can be electrically conductive and has a good electrical conductivity. The carbon cloth is also very lightweight. Furthermore, the carbon cloth can be used both as a structural component and as a conductive additive in application. For example, the carbon cloth can be used as a carbon material or carbon phase in the composite materials described in U.S. patent application Ser. No. 13/008,800. The carbon cloth can even be used where the resulting composite is desired to be very thin.

Without being bound by theory, the relatively high cellulose content in cotton cloth may provide a carbon cloth.

Therefore, the cotton can be natural cotton or synthetically made from cellulose. In certain embodiments, the cotton cloth has a cellulose concentration greater than about 90% by weight.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method of manufacturing carbon cloth comprising:
providing a single cotton cloth as a structural component;
hot pressing the cotton cloth, wherein the cotton cloth consists of a weave, knit, intertwine, or interlace; and
pyrolyzing the hot pressed cotton cloth to form the carbon cloth, wherein the carbon cloth consists of the pyrolyzed cotton cloth retaining the same structure as the provided single cotton cloth.

2. The method of claim 1, wherein the cotton cloth comprises a thread count of about 1 to about 100 threads/cm.

3. The method of claim 1, wherein the cotton cloth comprises a density of about 1 to about 10 mg/cm$^2$.

4. The method of claim 1, wherein the carbon cloth comprises a thread count of about 1 to about 100 threads/cm.

5. The method of claim 4, wherein the carbon cloth comprises a density of about 0.5 to about 10 mg/cm$^2$.

6. The method of claim 1, wherein the pyrolyzing the cotton cloth comprises heating the cotton cloth to greater than about 900° C.

7. The carbon cloth formed by the method of claim 1.

8. The carbon cloth of claim 7, further comprising a thickness of about 10 to about 100 microns.

9. The carbon cloth of claim 7, further comprising a density of about 0.5 to about 10 mg/cm$^2$.

10. A battery comprising the carbon cloth of claim 7.

11. The method of claim 1, wherein the provided cotton cloth is rolled.

12. The method of claim 11, further comprising unrolling the cotton cloth and feeding the cotton cloth into a machine for processing.

* * * * *